US008918515B1

(12) United States Patent
Partow-Navid et al.

(10) Patent No.: US 8,918,515 B1
(45) Date of Patent: Dec. 23, 2014

(54) INTERSTITIAL REDIRECTION MANAGEMENT

(75) Inventors: Puya Partow-Navid, Los Angeles, CA (US); Spencer Smith, Sherman Oaks, CA (US)

(73) Assignee: Symantec Corporation, Mountain View, CA (US)

( * ) Notice: Subject to any disclaimer, the term of this patent is extended or adjusted under 35 U.S.C. 154(b) by 1904 days.

(21) Appl. No.: 11/054,978

(22) Filed: Feb. 10, 2005

(51) Int. Cl.
*G06F 9/44* (2006.01)
*H04L 29/08* (2006.01)

(52) U.S. Cl.
CPC ............................. *H04L 29/08576* (2013.01)
USPC ............. 709/227; 709/219; 709/224; 705/44; 715/205; 719/313

(58) Field of Classification Search
CPC ... H04L 29/08576; H04L 43/00; G06F 9/542; G06F 17/30882
USPC ........................................................ 709/227
See application file for complete search history.

(56) References Cited

U.S. PATENT DOCUMENTS

| | | | | |
|---|---|---|---|---|
| 6,237,035 | B1 * | 5/2001 | Himmel et al. | 709/224 |
| 7,035,921 | B1 * | 4/2006 | Baker | 709/224 |
| 7,107,346 | B2 * | 9/2006 | Boyd | 709/227 |
| 2002/0069282 | A1 * | 6/2002 | Reisman | 709/227 |
| 2003/0028565 | A1 * | 2/2003 | Landsman et al. | 707/513 |
| 2004/0024848 | A1 * | 2/2004 | Smith et al. | 709/219 |
| 2005/0021943 | A1 * | 1/2005 | Ikudome et al. | 713/160 |
| 2005/0060646 | A1 * | 3/2005 | Gauthier et al. | 715/513 |
| 2005/0138633 | A1 * | 6/2005 | Barsade et al. | 719/313 |
| 2008/0201488 | A1 * | 8/2008 | Kenner et al. | 709/245 |
| 2009/0328236 | A1 * | 12/2009 | Schmelzer | 726/30 |
| 2011/0082793 | A1 * | 4/2011 | Krueger et al. | 705/44 |

OTHER PUBLICATIONS

Sabin, Todd, "Comparing binaries with graph isomorphisms", downloaded from http://www.bindview.com/Services/Razor/Papers/2004/comparing_binaries.cfm, Jan. 17, 2006, Cupertino, CA.
Flake, Halvar, "Automated Reverse Engineering" Black Hat Windows 2004, downloaded from http://www.blackhat.com/html/bh-media-archives/bh-archives-2004.html, Jan. 17, 2006, Seattle, WA.
"Gold Parser, A Free Multi-Platform Parser Generator", [online] devincook.com [retrieved Oct. 7, 2003] Retrieved from the Internet: <URL: http://www.devincook.com/goldparser/index.htm>.

(Continued)

*Primary Examiner* — Phuoc Nguyen
*Assistant Examiner* — Kishin G Belani
(74) *Attorney, Agent, or Firm* — Fenwick & West LLP

(57) ABSTRACT

An interstitial manager (100) monitors (210) network communications received by a client computer and detects (215) a potential to initiate contact with a remote computer system. When a potential to initiate contact with a remote computer system is detected (215), the interstitial manager (100) determines (220) whether the potential to initiate contact with the remote computer system entails redirection to an alternate location. The determination (220) of whether the potential to initiate contact with the remote system entails redirection is responsive to satisfying at least one condition from the group of conditions consisting of determining whether a client browser attempts to contact an address associated with the remote computer system, and identifying at least one link embedded within the network communication possessing characteristics consistent with interstitial redirection. Responsive to determining (220) that the potential to initiate contact with the remote computer system entails redirection to an alternate location, the interstitial manager (100) invokes (230) interstitial management procedures.

19 Claims, 3 Drawing Sheets

(56) References Cited

OTHER PUBLICATIONS

"RFC 2821—Simple Mail Transport Protocol", Klensin J., editor, Apr. 2001, [online] Faqs.org [retrieved Oct. 13, 2003] Retrieved from the Internet: <URL: http://www.faqs.org/rfcs/rfc2821.html>.

Pop-Up Stopper Professional [Online] Apr. 22, 2005, [Retrieved from the Internet on Apr. 22, 2005] Retrieved from the Internet: <URL: http://www.panicware.com/index.html>.

AdsCleaner v 4.3 for Windows NT/2000/XP, [Online] Apr. 22, 2005 [Retrieved from the Internet on Apr. 22, 2005] Retrieved from the Internet: <URL: http://www.adscleaner.com>.

AntiTracer: Unwanted Pop-ups and other Advertisements, [Online] Apr. 22, 2005, [Retrieved from the Internet on Apr. 22, 2005] Retrieved from the Internet: <URL: http://www.antitracer.com/popup_killer.html>.

\* cited by examiner

INTERSTITIAL REDIRECTION MANAGEMENT

TECHNICAL FIELD

The present invention relates generally to computer security, and more particularly to managing interstitial advertisement redirection.

BACKGROUND ART

Internet usage, and particularly that of the World Wide Web (henceforth referred to as simply the "web"), is growing explosively, particularly as the number of remote computer systems and users that have access to the Internet continue to rapidly expand. The vast use of the Internet and its potential as an advertising vehicle has not been lost on the commercial marketplace. The display of each network communication such as a web page, electronic mail message, or instant message represents to many a new opportunity to portray information about a product or service to a potential customer. As the Internet's ability to provide a user with rich and rewarding content has expanded, so too has the advertising industry's attempts to capture and control the user's interest. Interstitial web page advertisements represent one of the advertising industry's newest pursuits.

Interstitial advertisements rely on a client browser's ability to automatically communicate with a remote computer system and display a web page once a link in a network communication has been selected. After establishing a suitable network connection to the Internet or similar network, a user at a client computer can easily employ a graphical client browser, such as Internet Explorer ("IE"), FireFox, Mozilla, Safari, or the like, to connect to a remote computer system. Once connected to the remote computer system, the client browser downloads a desired web page or similar network communication by supplying a specific address (known as a "URL" or Uniform Resource Locator) of that page to the browser. The URL identifies both the address of the remote computer system and the page of information sought at that site. Each remote computer system stores at least one, and often times substantially more than one, page. All arranged pages are in a pre-defined hierarchy, generally beginning, at the remote system's root, with a so-called "home page." Each such page is written in HTML (HyperText Markup Language) form. A page, in this context, refers to content accessed via a single URL, and can include, e.g., text, graphics and other information specified in the code for that particular page.

Once the content associated with the page is rendered, the user can position a cursor on a suitable hypertext link, button, or other suitable user input field displayed on that page and then, through, e.g., a mouse "click", effectively download a file and/or render another desired page in succession until the user has finished his or her visit to that site. Once finished, the user can transition through a link to a page at another remote computer system, and so forth. A link specifies a complete web address of an associated page, including a domain name of its hosting web site at which that page is situated. Consequently, by simply and successively positioning and selecting an appropriate link, the user can readily retrieve an HTML file for each desired page from its corresponding remote computer system.

The simplicity of browsing the web, coupled with the relative low cost of accessing the Internet, and the relative ease through which a remote computer system can be established, are collectively fueling unparalleled growth and diffusion of the Internet itself, remote computer systems, and the Internet user community throughout the world. In that regard, by establishing remote computer systems, merchants, vendors and other information providers have an unparalleled opportunity to reach enormous numbers of potential consumers—regardless of where these consumers reside—at costs far less than previously thought possible. Moreover, given the staggering amount and wide diversity of information currently available on the web, web browsing is becoming so popular a pastime for sufficient numbers of individuals that browsing is beginning to divert significant viewership away from traditional forms of mass entertainment, such as television and cable. With the wide and ever-growing reach of the web as a source of consumer information and the increasing consumer acceptance of electronic commerce, advertisers have clearly recognized the immense potential of the web as an effective medium for disseminating advertisements to a consuming public.

Conventional web-based advertising has generally yielded unsatisfactory results and thus has usually been shunned by most large advertisers. In that regard, several approaches exist in the art for implementing web based advertisements. A predominant format, referred to as a "banner", for a web advertisement takes the form of a rectangular graphical display situated, typically at a fixed location, in a rendered web page. A banner is generally produced by properly embedding specific HTML code for that banner within the HTML coding for a given web page in which the banner is to appear. A client browser, as it interprets and sequentially executes the HTML code for a fetched page, will, in turn, compile and execute the embedded code for the banner and hence display the banner, as part of a rendered page and at a specified location thereon. This type of file requires time to download and must be downloaded and assembled by the browser on the page prior to that page being fully rendered. Hence, a user will likely wait a considerable amount of time before all the page components for multimedia content are fully downloaded to permit that page to be rendered. To preserve the form and function of the web page, many content suppliers sharply limit the file size of such banners to be rendered on their pages, in order to minimize page download (and hence latency) times. Despite these limitations, most users have trained themselves to filter out banner advertisements, further curtailing the advertisement's effectiveness.

In response to the failure of banner and other forms of web advertisements, interstitial advertisements were implemented. Generally speaking, and with specific reference to web advertising, interstitial ads are displayed during an interval of time that occurs after a user has clicked on a link embedded in a web page or similar network communication to retrieve a desired web page but before the browser has started rendering the selected page. Typically, when a user elects to enter or exit a remote computer system, a page appears with its advertisement in place of the requested page. Either the user must select a further link within the displayed page to received the originally requested page, or the advertisement page will disappear after a fixed time and automatically redirect the user to the requested web site. This type of broadcast model advertisement interferes with the user's remote computer system expectation and network experience. Interstitial advertisements also increase network bandwidth requirements and can slow overall connection efficiency.

The deficiencies inherent in all known web advertising techniques have, to a significant extent, collectively inhibited the use of web advertising in general. In view of the fundamental drawbacks associated with various web based advertising techniques known in the art, interstitial web advertising appears to hold the most promise of all these techniques and its use as an advertising vehicle is growing exponentially. With the promise of increased advertising effectiveness comes the price of decreased user network satisfaction, increased bandwidth requirements, and increased risk to a user's computing environment due to uncontrolled and unsolicited contact with an unknown remote computer system. Users can no longer rely that a link will provide direct connection to the depicted remote computer system, nor are they informed prior to selecting the link of the identity of any intermediate destinations.

There remains a clear need for an effective and automated way to manage interstitial network connectivity. What is needed are methods, apparatuses, and computer readable media to detect and manage interstitial connectivity associated with links embedded in network communications.

DISCLOSURE OF INVENTION

Methods, apparatuses, and computer-readable media detect and manage interstitial network connectivity. An interstitial manager (100) monitors (210) network communications received by a client computer and detects (215) a potential to initiate contact with a remote computer system. When a potential to initiate contact with a remote computer system is detected (215), the interstitial manager (100) determines (220) whether the potential to initiate contact with the remote computer system entails redirection to an alternate location. The determination (220) of whether the potential to initiate contact with the remote system entails redirection is responsive to satisfying at least one condition from the group of conditions consisting of determining whether a client browser attempts to contact an address associated with the remote computer system, and identifying at least one link embedded within the network communication possessing characteristics consistent with interstitial redirection. Responsive to determining (220) that the potential to initiate contact with the remote computer system entails redirection to an alternate location, the interstitial manager (100) invokes (230) interstitial management procedures.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

These and other more detailed and specific objects and features of the present invention are more fully disclosed in the following specification, reference being to the accompanying drawings, in which.

The Figures depict embodiments of the present invention for purposes of illustration only. One of ordinary skill in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
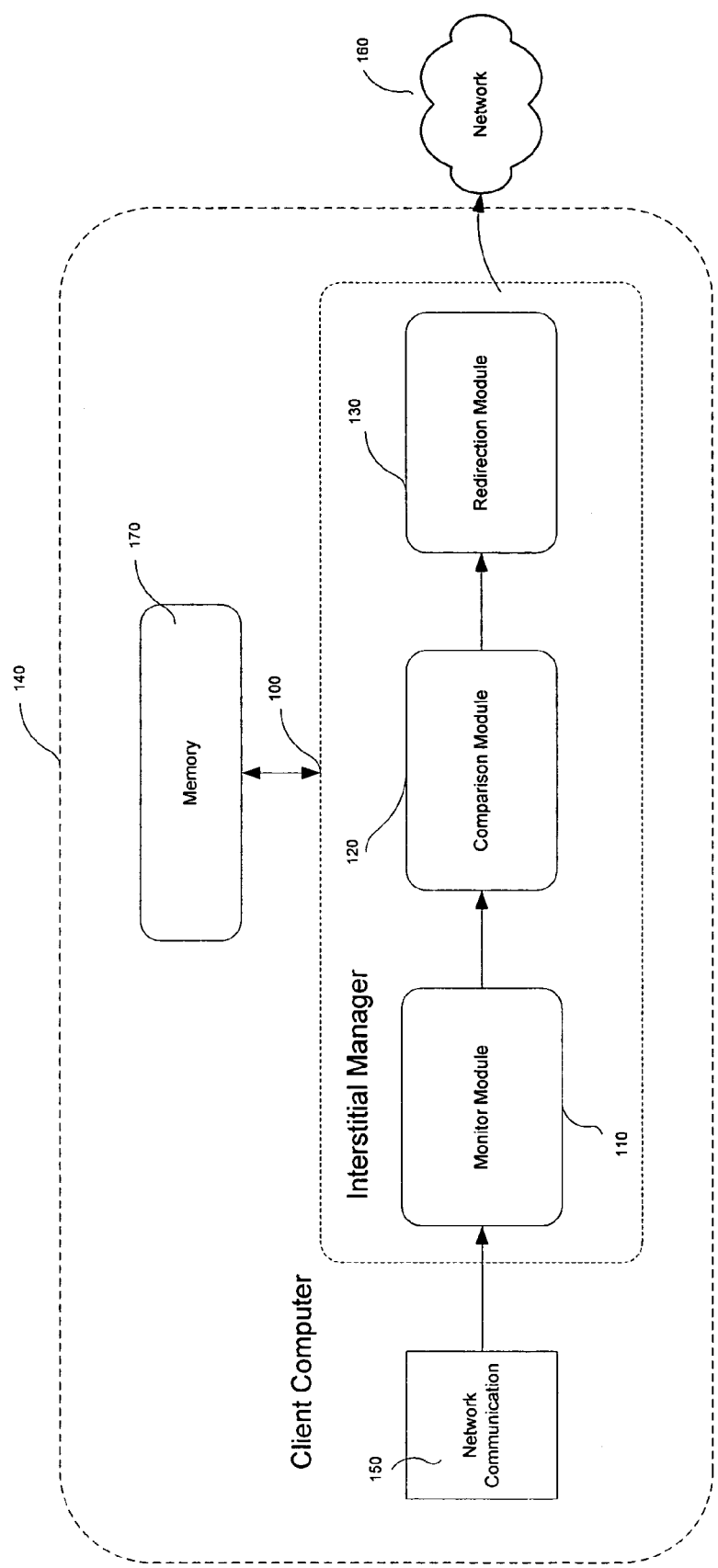
FIG. 1 is a high level block diagram of a apparatus for managing interstitial network connectivity between a network and a client computer according to some embodiments of the present invention.

FIG. 1 illustrates a high level block diagram of a apparatus for managing interstitial network connectivity. An interstitial manager 100 monitors 210 network communication and detects 215 a potential to contact a remote computer system. Network communications such as electronic mail messages, web pages, text messages following the SMS protocol, etc., can contain hyperlinks that direct the user to a remote computer system without additional interaction between the user and the client based network application. When a network communication possesses the potential to contact a remote computer system, the interstitial manager 100 determines 220 whether this potential entails redirection to an alternate location, and when necessary, the interstitial manager 100 invokes 230 interstitial management procedures to manage interstitial network connectivity.

The interstitial manager 100 offers the following advantages over the prior art:

preventing unsolicited redirection of network connectivity;

protecting the user's computing environment from malicious computer code associated with interaction with unknown remote computer systems;

expediting requests to connect to remote computer systems; and limiting the bandwidth impact of unsolicited interstitial network connectivity.

In one embodiment, the interstitial manager 100 comprises a monitor module 110, a comparison module 120, and a redirection module 130. While not necessarily residing at the same location or within the same device, the three modules interact to provide various interstitial manager 100 functionalities. According to one embodiment of the present invention, an interstitial manager 100 is interposed between, and communicatively coupled to, a client computer 140 and a network 160. In another embodiment, and as shown in FIG. 1, the monitor module 110, the comparison module 120, and the redirection module 130 reside within the client computer 140. In another embodiment, all components of the interstitial manager 100 reside on a computing device separate from the client computer 140. In other embodiments of the present invention, the components of the interstitial manger 100 are distributed between the client computer 140 and other computing devices associated with network 160.

It is to be understood that although the interstitial manager 100 is illustrated in FIG. 1 as a single entity, as the term is used herein an interstitial manager 100 refers to a collection of functionalities which can be implemented as software, hardware, firmware or any combination of these. Where the interstitial manager 100 is implemented as software, it can be implemented as a standalone program, but can also be implemented in other ways, for example as part of a larger program, as a plurality of separate programs, as one or more device drivers or as one or more statically or dynamically linked libraries. The software can reside in any computer-readable medium or media such as magnetic disks, magnetic tape, CDs, DVDs, optical disks, or the like. An interstitial manager 100 can also be instantiated on and/or as part of a server, client, firewall, intrusion detection system, proxy, gateway, switch and/or any combination of these and/or other computing devices and/or platforms.

In the embodiment illustrated in FIG. 1, the monitor module 110 of the message manager 100 monitors 210 network communications and detects 215 the potential to initiate network connectivity between the client computer 140 and the network 160. In that embodiment the comparison module 120 determines 220 whether the potential to contact the remote computer system is redirected to an alternate location. Implementation methodologies known within the art for monitoring 210 network communications and detecting 215 a potential to contact a remote computer system can be successfully utilized by the interstitial manager 100. These implementation methodologies and the specifics of their application within the context of the present invention will be apparent to one of ordinary skill in the relevant art in light of this specification. When it has been determined that a potential to contact a remote computer system has been redirected to an alternate location, the redirection module 130 appropriately manages the interstitial connectivity by invoking 230 interstitial management procedures.

Figure 2:
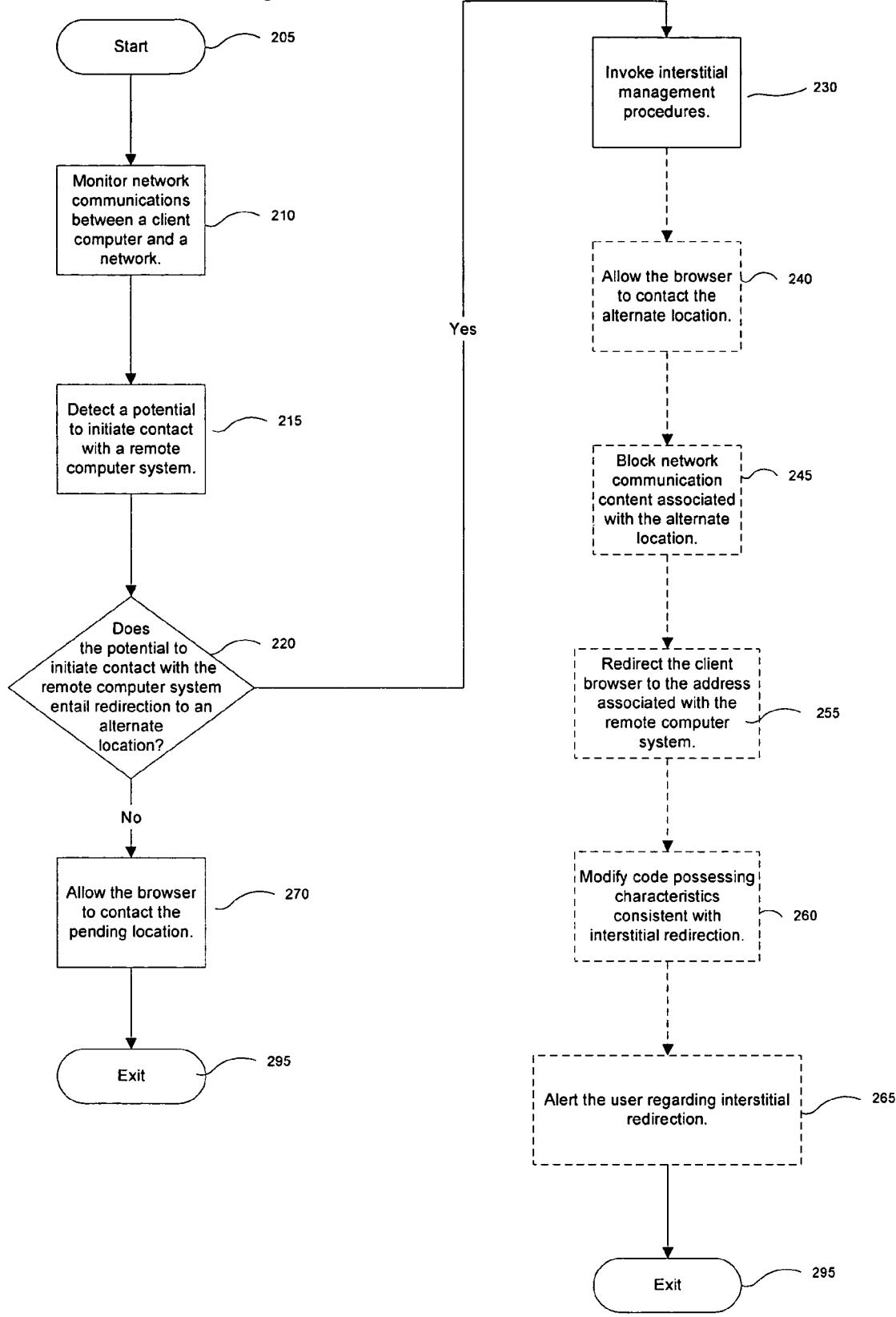
FIG. 2 is a flow diagram of one method embodiment of the present invention for managing interstitial network connectivity.

FIG. 2 is a flow diagram of one method embodiment of the present invention for managing interstitial network connectivity. The interstitial manager 100 monitors 210 network communication between the client computer 140 and network 160 for a potential to contact a remote computer system. In one embodiment of the present invention the remote computer system contact is initiated by the user selecting a link embedded in a network communication. In another embodiment of the present invention, the interstitial manager 100 detects 215 other potential for initiating contact with a remote computer system, such as cutting and pasting URLs depicted in a network communication into the address window of a client browser. When the interstitial manger 100 detects 215 actions consistent with the initiation of contact to a remote computer system, the interstitial manager 100, in one embodiment of the present invention, extracts and stores the remote computer system URL associated with remote computer system that the user is attempting to contact. Having stored the selected URL, the interstitial manager 100 then determines whether the potential to contact the remote computer system is redirected to an alternate location. Whether or not the potential to contact the remote computer system is redirected to an alternate location is determined 220 by the satisfaction of at least one of the following conditions.

One condition the interstitial manager 100 considers in the determination 220 of whether the potential to contact the remote computer system has been redirected to an alternate location is whether the client browser is attempting to contact the user-selected address associated with the remote computer system. To make this determination 220, the interstitial manager 100 determines whether the GET URL pending before the client browser matches the stored URL associated with the remote computer system. An HTML GET instruction sends data as part of the URL. For example, if a form has a field associated with a GET command, the data placed in the field will be added as data to the URL making the URL unique in its ability to direct the user to a specific site and supply the site with data. Responsive to a match between the GET URL pending before the client browser and the stored URL associated with the remote computer system that the user attempted to contact, the interstitial manger 100 concludes no interstitial connectivity is present. Based on this conclusion, the interstitial manager 100 allows 270 the client browser to contact the remote computer system associated with the pending URL and display the appropriate network communication. A failure to match the GET URL pending before the client browser with the stored URL associated with the user-selected remote computer system prompts the interstitial manager 100 to conclude that interstitial connectivity is present. Responsive to arriving at this conclusion, the interstitial manager 100 invokes 230 interstitial management procedures and takes appropriate action to control the impact of the interstitial connectivity. In another embodiment of the present invention, the interstitial manager 100 examines the use of the POST command to determine whether the potential to contact the remote computer system has been redirected to an alternate location.

To gain a better understanding of the URL comparison process, consider a link from a network communication directing the user to a reality news program having a URL http://www.realitynewsonline.com/index.html. When the user selects this link, the interstitial manager 100 in one embodiment of the present invention captures the event and stores the URL in memory 170. In the instance where interstitial activity is present, the user is redirected, for example, to http://media.fastlink.net/w/ get.media?sid7185&m=5url=http %3A//www.realitynewsonline.com/index.html. The interstitial manager 100 compares the URL stored in memory 170 (realitynewsonline.com) with the GET URL pending before the client browser (fastlink.net). Finding that the two URLs do not match, the interstitial manager 100 concludes that interstitial connectivity is present, since the user's potential to contact realitynewsonline.com has been redirected to fastlink.net. Responsive to this conclusion, the interstitial manager 100 takes appropriate action to mitigate the impact of the interstitial connectivity.

Another condition considered by the interstitial manager 100 in the determination 220 of whether the potential to contact the remote computer system has been redirected to an alternate location is the identification of at least one link embedded within the network communication possessing characteristics consistent with interstitial redirection. One method to redirect a user's remote computer system request is to alter the HTML code associated with the link embedded in the network communication. The HTML code can be altered by appending a function to the HREF associated with the link. HREF is an HTML code used to indicate to what URL the link is being created. For example, a tag <A HREF="resumepage.html">myresume</A> creates a link to "my resume."

Returning to the previous example of http://www.realitynewsonline.com/index.html, the HREF's are followed by an ONCLICK that passes the URL to a Java-script function. (ONCLICK sets a script to run when the user clicks on a link) Consider the link:

HREF=http://www.realitynewsonline.com/
index.htmlONCLICK=this.HREF=FCx(this.HREF).
When the user clicks on the link, the URL realitynewsonline.com is passed into the FCx function. In the FCx function, the URL is appended to
    http://media.fastlink.net/w/
get.media?sid=7185&m=5url=.
This forms the redirection link
    http://media.fastlink.net/w/
get.media?sid=7185&m=5url=http %3A//www.realitynewsonline.com/index.html.
The redirection link takes the user to the fastlink web page yet possesses the original link to which the user is ultimately directed. In one embodiment of the present invention, the interstitial manager 100 scans the page's HTML for at least one instance of an 1-IREF followed by an ONCLICK as illustrated in the example above as evidence of characteristics consistent with interstitial redirection. The presence of such a combination enables the interstitial manager 100 to conclude that the potential to initiate contact to a remote computer system (realitynewsonline.com) will be redirected to an alternate location (fastlink.net). In one embodiment of the present invention, the interstitial manager 100 mitigates the impact of interstitial redirection by modifying 260 the HTML code. The interstitial manager 100 modifies the HTML code by removing the alternate location function (FCx) and replacing it with a new function. Continuing with the example above, when the interstitial manager 100 detects HREF=http://www.realitynewsonline.com/
index.htmlONCLICK=this.HREF=FCx(this.HREF)
It is replaced with
HREF=http://www.realitynewsonline.com/
index.htmlONCLICK=this.HREF=SymAD(this.href).
The SymAD function takes the user to the remote computer system originally selected, thwarting the interstitial redirection.

In another embodiment of the present invention, the interstitial manager 100 replaces the URL associated with the location function (FCx) rather than replacing the entire function. When a function like FCx is located, the URL within the function (fastlink.net) is replaced with the URL of the original remote computer system request (realitynewsonline.com). While the FCx function remains intact, the result is that the user is redirected to the originally requested remote computer system.

In one embodiment of the present invention, the interstitial manager 100 modifies 260 code possessing characteristics consistent with interstitial redirection to direct the client browser to the address associated with the remote computer system. This can include replacing the redirection function as described above, or modifying 260 or replacing the target URL, or altering the timeout function to zero or a very small number. Having a small timeout would force the redirection to contact the alternate location but then immediately be redirected to the originally selected remote computer system. Such implementation-methodologies for manipulating HTML code are well known to one of ordinary skill in the art and can be successfully utilized by interstitial manager 100. The specifics of these implementation methodologies and their application within the context of the present invention will be apparent to one of ordinary skill in the relevant art in light of this specification.

There are legitimate remote computer systems that use an ONCLICK following an HREF to redirect a user's request. To decrease the instances of false positives, the interstitial manager 100, in one embodiment of the present invention, compares the redirection function with a list of known undesirable functions. When the interstitial manager 100 recognizes characteristics consistent with interstitial redirection, such as an ONCLICK following an HREF, the interstitial manager 100 concludes the potential 220 for redirection exists and compares the existing function with a blacklist of undesirable interstitial functions. When a match is found, the undesirable function is replaced and/or modified. In another embodiment of the present invention, the interstitial manager 100 analyzes each Java Script function on a page to determine 220 whether the potential to initiate remote contact with a remote system entails redirection to an alternate site. When the interstitial manager 100 determines the potential for redirection exists, the manager then determines whether the URL within the function matches a URL on the blacklist. Again, when a match is found, the function is either replaced with a new function such as SymAD(this.HREF) or modified. In another embodiment of the present invention, after the interstitial manager 100 concludes that the potential for initiation of a remote system entails redirection to an alternate site, the interstitial manager 100 reduces the instances of false positives by comparing the redirection link to a blacklist of undesirable links.

Responsive to the interstitial manager 100 determining that the potential to initiate contact to the remote computer system is redirected to an alternate location, the redirection module 130 of the interstitial manager 100 invokes interstitial management procedures 230 and takes appropriate action to manage the interstitial activity. In one embodiment of the present invention, the interstitial manager 100 blocks 245 network communicative content associated with the alternate location. In another embodiment of the present invention, the interstitial manager 100 redirects 255 the client browser to the URL associated with the user-selected remote computer system. The interstitial manager 100 in another embodiment of the present invention displays a warning alerting the user 265 that the client browser has been redirected to a remote site that is different from the remote computer system selected by the user. In another embodiment of the present invention the interstitial manager 100 modifies 260 code possessing characteristics consistent with interstitial redirection. It will be apparent to one of ordinary skill in the art that other techniques and implementation methodologies for managing network connectivity and/or mitigating the impact of interstitial connectivity can be successfully utilized by the interstitial manager 100.

Figure 3:
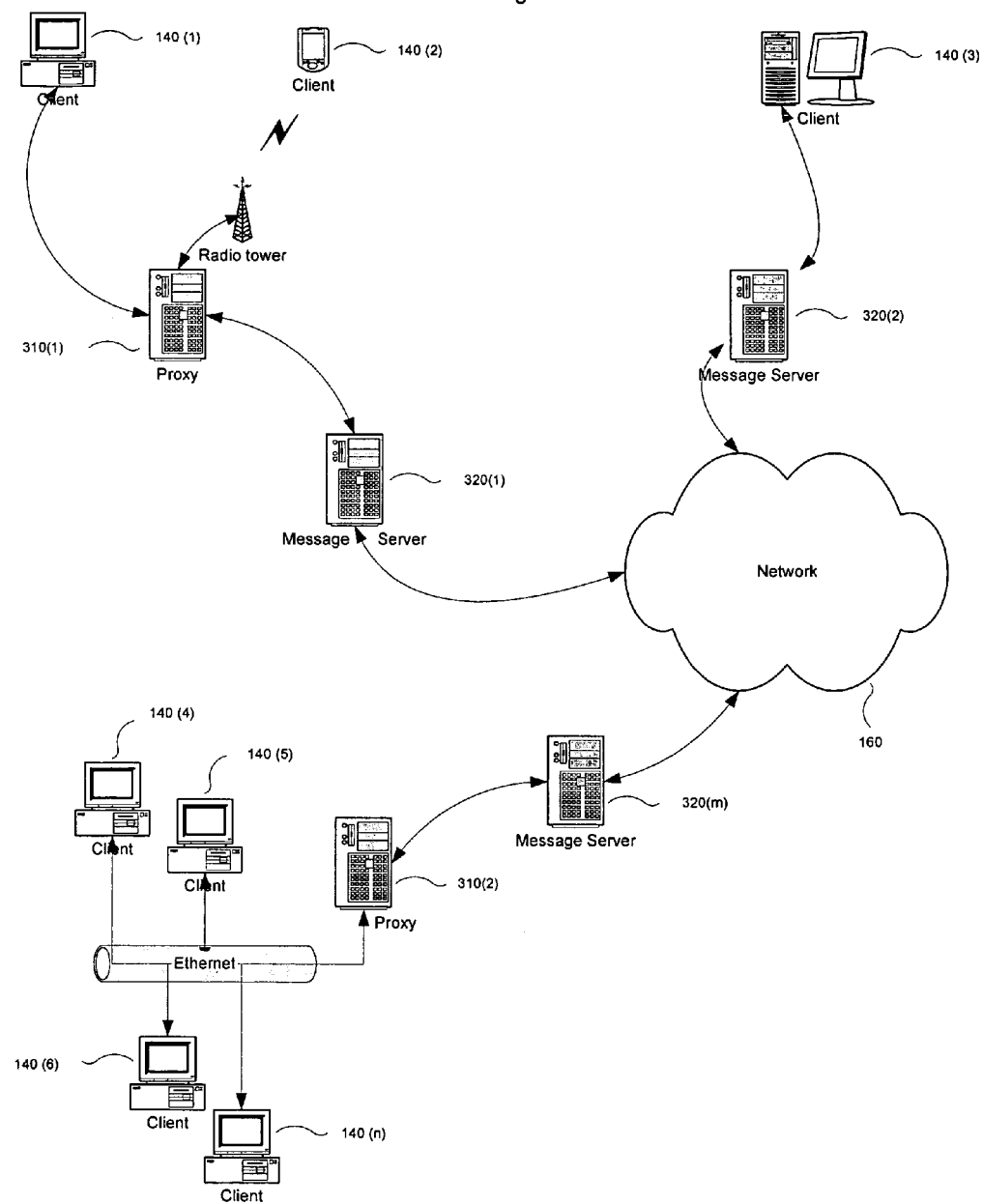
FIG. 3 is a block diagram of a network configuration for managing interstitial network connectivity according to one embodiment of the present invention.

FIG. 3 is a block diagram of a network configuration for managing interstitial network connectivity according to one embodiment of the present invention. As described herein, an interstitial manager 100 can reside entirely on client computer 140. Client computer 140 can be a desktop, laptop, PDA, etc. Interstitial manager 100 can also reside on a proxy device 310 interposed between one or more client computers 140 and the network 160, server 320, or the like. In yet another embodiment of the present invention, interstitial manager 100 can reside on a server 320 or be functionally distributed between or among multiple computing devices. Although exemplary embodiments are described herein using the words "client" and "server," the terms "client" and "server" are chosen for convenience and might not necessarily correspond directly to any particular role in a system design.

While it is contemplated that the present invention will be used on network computers, it is possible to apply the methodology presented here to network environments with multiple servers in several locations. Although not required, method embodiments of the invention can be implemented via computer-executable instructions, such as routines executed by a general purpose computer, e.g., a server or client computer. The computer-executable instructions can be embodied in hardware, firmware, or software residing on at least one computer-readable media, such as hard discs, floppy discs, optical drives, Compact Discs, Digital Video Discs, etc. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured, or constructed to perform at least one of the computer-executable instructions as explained herein. The invention can also be practiced in distributed computing environments where tasks or modules are performed by remote processing devices, which are linked through a communications network. In a distributed computing environment, program modules may be located in both local and remote memory storage devices.

The above description is included to illustrate the operation of various embodiments of the invention and is not meant to limit the scope of the invention. The elements and steps of the various embodiments described above can be combined to provide further embodiments. The scope of the invention is to be limited only by the following claims. Accordingly, from the above discussion, many variations will be apparent to one skilled in the art that would yet be encompassed by the spirit and scope of the present invention.

What is claimed is:

1. A computer implemented method for managing interstitial network connectivity, the method comprising the steps of:
   identifying a link embedded within a web page received by a client computer, the link referencing an address at a first remote computer system;
   detecting a user selection of the link to initiate a network communication with the first remote computer system;
   determining whether the network communication with the first remote computer system was redirected to a second remote computer system by determining that a client browser displaying the web page attempted to contact an address other than the address referenced by the user-selected link; and
   responsive to determining that the network communication with the first remote computer system was redirected to the second remote computer system, automatically blocking network communication content associated with the second remote computer system and modifying code in the web page possessing characteristics consistent with interstitial redirection to direct the network communication to the first remote computer system.

2. The method of claim 1 wherein determining that the client browser attempted to contact an address other than the address referenced by the user-selected link comprises comparing the address referenced by the user-selected link with a GET address issued by the client browser.

3. The method of claim 2 further comprising the step of:
   responsive to the address referenced by the user-selected link not matching the GET address issued by the client browser:
      accessing a list concerning known redirection addresses; and
      comparing the GET address issued by the client browser with known redirection addresses from the list; and
   responsive to the GET address issued by the client browser matching a known redirection address from the list, concluding that the network communication with the first remote computer system is redirected to the second remote computer system.

4. The method of claim 1 further comprising the step of:
   scanning the web page to identify an instance of HTML code possessing characteristics consistent with interstitial redirection.

5. The method of claim 4 wherein an instance of HTML code possessing characteristics consistent with interstitial redirection is presence of an HREF followed by an ONCLICK.

6. The method of claim 1 wherein the step of modifying code comprises reducing an amount of time a client browser displays network communication content associated with the second remote computer system.

7. The method of claim 1 wherein the step of modifying code comprises replacing redirection functionality directing a client browser to the second remote computer system with functionality directing the client browser to the first remote computer system.

8. The method of claim 1 wherein the step of modifying code comprises altering existing HTML code to direct a client browser to the first remote computer system.

9. The method of claim 1, wherein the identifying, detecting, determining, and invoking steps are performed by the client computer.

10. The method of claim 1, wherein responsive to determining that the network communication with the first remote computer system was redirected to the second remote computer system, the network communication is redirected to the address referenced by the user-selected link.

11. A non-transitory computer-readable storage medium containing a computer program product for managing interstitial network connectivity, the computer program product comprising program code for the steps of:
   identifying a link embedded within a web page received by a client computer, the link referencing an address at a first remote computer system;
   detecting a user selection of the link to initiate a network communication with the first remote computer system;
   determining whether the network communication with the first remote computer system was redirected to a second remote computer system by determining that a client browser displaying the web page attempted to contact an address other than the address referenced by the user-selected link; and
   responsive to determining that the network communication with the first remote computer system was redirected to the second remote computer system, automatically blocking network communication content associated with the second remote computer system and modifying code in the web page possessing characteristics consistent with interstitial redirection to direct the network communication to the first remote computer system.

12. The non-transitory computer-readable storage medium of claim 11 wherein determining that the client browser attempted to contact an address other than the address referenced by the user-selected link comprises comparing the address referenced by the user-selected link with a GET address issued by the client browser.

13. The non-transitory computer-readable storage medium of claim 12 further comprising program code for the steps of:
   responsive to the address referenced by the user-selected link not matching the GET address issued by the client browser:
      accessing a list concerning known redirection addresses; and
      comparing the GET address issued by the client browser with known redirection addresses from the list, and
   responsive to the GET address issued by the client browser matching a known redirection address from the list, concluding that the network communication with the first remote computer system is redirected to the second remote computer system.

14. The non-transitory computer-readable storage medium of claim 11 further comprising program code for the step of:
   scanning the web page to identify an instance of HTML code possessing characteristics consistent with interstitial redirection.

15. The non-transitory computer-readable storage medium of claim 14 wherein an instance of HTML code possessing characteristics consistent with interstitial redirection is presence of an HREF followed by an ONCLICK.

16. The non-transitory computer-readable storage medium of claim 11, wherein the step of modifying code comprises reducing an amount of time a client browser displays network communication content associated with the second remote computer system.

17. The non-transitory computer-readable storage medium of claim 11, wherein the step of modifying code comprises replacing redirection functionality directing a client browser to the second remote computer system with functionality directing the client browser to the first remote computer system.

18. The non-transitory computer-readable storage medium of claim 11 wherein the step of modifying code comprises altering existing HTML code to direct a client browser to the first remote computer system.

19. A computer system for managing interstitial network connectivity, comprising:
 a computer processor for executing computer program instructions;
 a non-transitory computer-readable storage medium having executable computer program instructions tangibly embodied thereon, the executable computer program instructions comprising:
  a monitor module configured to identify a link referencing an address at a first remote computer system embedded within a web page received by a client computer, and detect a user selection of the link to initiate a network communication with the first remote computer system;
  a comparison module configured to determine whether the network communication with the first remote computer system was redirected to a second remote computer system by comparing the address referenced by the user-selected link with a GET address issued by a client browser to determine that the client browser displaying the web page attempted to contact an address other than the address referenced by the user-selected link; and
  a redirection module configured to automatically block network communication content associated with the second remote computer system and modify code in the web page possessing characteristics consistent with interstitial redirection to direct the network communication to the first remote computer system responsive to determining that the network communication with the first remote computer system was redirected to the second remote computer system.

* * * * *